(12) United States Patent
Liao et al.

(10) Patent No.: US 11,288,221 B2
(45) Date of Patent: Mar. 29, 2022

(54) GRAPH PROCESSING OPTIMIZATION METHOD BASED ON MULTI-FPGA ACCELERATOR INTERCONNECTION

(71) Applicant: Huazhong University of Science and Technology, Hubei (CN)

(72) Inventors: Xiaofei Liao, Hubei (CN); Fan Zhang, Hubei (CN); Long Zheng, Hubei (CN); Hai Jin, Hubei (CN); Zhiyuan Shao, Hubei (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 97 days.

(21) Appl. No.: 16/896,464

(22) Filed: Jun. 9, 2020

(65) Prior Publication Data
US 2021/0081347 A1 Mar. 18, 2021

(30) Foreign Application Priority Data
Sep. 17, 2019 (CN) .......................... 201910879589.X

(51) Int. Cl.
G06F 13/40 (2006.01)
G06F 9/48 (2006.01)
G06F 9/50 (2006.01)

(52) U.S. Cl.
CPC ........ *G06F 13/4027* (2013.01); *G06F 9/4843* (2013.01); *G06F 9/505* (2013.01)

(58) Field of Classification Search
CPC ... G06F 9/505; G06F 13/4027; G06F 13/4843
See application file for complete search history.

(56) References Cited

U.S. PATENT DOCUMENTS

| | | | |
|---|---|---|---|
| 9,122,513 B2* | 9/2015 | Jacob | G06F 9/4881 |
| 10,216,546 B1* | 2/2019 | Davison | G06F 9/5066 |
| 2015/0007182 A1* | 1/2015 | Rossbach | G06F 9/4843 718/102 |
| 2017/0024352 A1* | 1/2017 | Lavasani | G06F 13/36 |
| 2018/0342030 A1* | 11/2018 | Magleby | G06F 17/18 |
| 2019/0065154 A1* | 2/2019 | Thambidorai | G06F 16/9024 |
| 2019/0354526 A1* | 11/2019 | Roth | G06F 16/278 |
| 2019/0391791 A1* | 12/2019 | Bebee | G06F 8/4441 |

* cited by examiner

*Primary Examiner* — Henry Tsai
*Assistant Examiner* — Christopher A Daley
(74) *Attorney, Agent, or Firm* — Michael X. Ye; Rimon Law

(57) ABSTRACT

A graph processing optimization method that addresses the problems such as the low computation-to-communication ratio in graph environments, and high communication overhead as well as load imbalance in heterogeneous environments for graph processing. The method reduces communication overhead between accelerators by optimizing graph partitioning so as to improve system scalability.

7 Claims, 3 Drawing Sheets

GRAPH PROCESSING OPTIMIZATION METHOD BASED ON MULTI-FPGA ACCELERATOR INTERCONNECTION

This application claims the benefit of China Patent Application No. 201910879589.X, filed on Sep. 17, 2019, which is incorporated by reference herein in its entirety

BACKGROUND OF THE INVENTION

1. Technical Field

The present invention relates to graph processing, and more particularly to a graph processing optimization method based on multi-FPGA accelerator interconnection.

2. Description of Related Art

As the demand for data analysis increasingly grows, large-scale graph processing has attracted extensive attention in various fields as a tool for defining data relationship. Graphs represent an abstract data structure that describes relation between objects using vertices and edges, wherein a vertex denotes an object, and an edge denotes relation between objects. Data that can be abstracted and described in the form of graphs are graph data. Graph processing is a process of using a graph as a data model to express and solve problems. A system oriented to solving graph processing problems with high performance is a graph processing system. System and methods for graph processing are continuously developed with the increased demand for data analysis.

For example, China Patent Publication No. CN104780213B discloses a load dynamic optimization method for principal and subordinate distributed graph manipulation system, which comprises the following steps: a dynamic re-dividing and controlling step for main calculating nodes, a load monitoring step in working calculating nodes, and a load transfer step. The known method is independent of the initial dividing of graph data. During the iteration execution of the working nodes, dynamic re-dividing is performed according to the instruction execution of the main nodes so as to perform load balancing; in the load monitoring step, the loads of the nodes are calculated, and before the end of the execution of each iteration, the loads are transmitted to other calculating nodes; besides, for the load transferring step, at the beginning of the execution of each iteration, the situation whether the nodes are overloaded or not is judged according to the load information which is received and monitored by other nodes, and the transferring nodes and the transferring amount are determined; when the iteration is completely executed, the load data is transferred to the target node, so that the dynamic load balancing of a distributed graph manipulation system is realized. Through the implementation of the dynamic optimization method, the problem that in the distributed graph manipulation system, the load is imbalanced can be solved.

For example, China Patent Publication No. CN108563808A discloses a design method of heterogeneous reconfigurable figure computation accelerator system based on FPGA. The entire accelerator system includes two heterogeneous modules, namely a PC and an FPGA. The specific steps are: first loading a drive module required by activation of the FPGA and turn on PCIe, DMA and other devices of the FPGA; selecting a graph processing accelerator engine according to the number of vertices and the number of the edges of the graph data to be processed; after the selection of the accelerator engine, pre-processing the graph data; transmitting the pre-processed graph data to the on-board DDR of an FPGA demoboard through the PCIe and the DMA; activating the accelerator to read the graph data starting with an address designated by the on-board DDR; using a controller to assign the graph data to different processing units for processing and computing; after the processing units complete data computing and processing, sending results to a computing result collecting module; the collecting module writing the results back to the on-board DDR, and after all the graph data are processed, the PC reading out the results from the on-board DDR.

For example, China Patent Publication No. CN109086867A discloses an FPGA-based convolutional neural network acceleration system. The system accelerates a convolutional neural network on an FPGA based on an OpenCL programming framework. The system comprises a data processing module, a data post-processing module, a convolutional neural network computing module, a data storage module and a network model configuration module. The convolutional neural network computing module includes a convolutional computing sub-module, an activation function computing sub-module, a pooling sub-module and a fully connected computing sub-module. The known system adapts parallelism to the FPGA and the convolutional neural network according to the state of the hardware resources of the FPGA during operation. It can operate the convolutional neural network on the FPGA with high-performance parallelism and streamlization, and can effectively reduce power consumption of the system while significantly enhancing the processing speed of the convolutional neural network, thereby providing satisfying real-time performance.

For example, China Patent Publication No. CN104899250B discloses a scaling method for graph processing based on separation between a graph structure and data information. The method comprises: performing separate migration as well as locality-sensitive and load-balancing optimized distribution on graph structure information and data information. The known method uses separate migration as well as locality-sensitive and load-balancing optimized distribution on graph structure information and data information to scale a graph processing system, so as to reduce loss of service performance of upper applications, and shorten the overall migration time during elastic migration of the computing system and service interruption time. The method improves resource utilization of cloud computing clusters and usability of upper application services, thereby facilitating deployment of critical computing services that have high throughput needs in cloud computing datacenters.

For example, China Patent Publication No. CN108683738A discloses a graph data processing method, applicable to computing nodes in a distributed computing node cluster. The known method comprises: acquiring sub-graph data that are partitioned from graph data to be processed; executing computing tasks for the sub-graph data so as to obtain corresponding global data and local data; writing the global data into a block chain network; updating the global data in the block chain network by the distributed computing node cluster; acquiring the latest global data from the block chain network; according to the acquired, latest global data and local data, iteratively executing the computing tasks for the sub-graph data until a iteration stopping condition is satisfied and a computing result is obtained.

For example, China Patent Publication No. CN104281664B discloses a distributed graph computing system and a data segmentation method and system. The method comprises: determining similarity between each data node in data to be processed and its first immediately adjacent node; acquiring an occurrence number of a label of the first immediately adjacent node, and determining whether there are at least two labels having the same occurrence number; if yes, identifying second immediately adjacent nodes corresponding to the at least two labels, respectively, and determining labels for the data nodes according to similarity between the data nodes and the second immediately adjacent nodes; grouping the data nodes having the same label into the same community, and storing the data nodes belonging to the same community into the same processing host. The known method fully considers similarity characteristics between data nodes and realizes community partitioning using labels, thereby saving computational overhead. Since data nodes having close relation are placed into the same processing host, cross-host communication and in turn communication overhead can be reduced.

With the continuous growth of graph sizes, the numbers of vertices and edges have reached a billion scale, making single-FPGA computing resources and memory resources incompetent. Multi-FPGA systems have thus been developed to provide more computing and memory resources, thereby being able to process graph data of a larger scale than a single FPGA system. Opposite to a CPU and a GPU, an FPGA features high-throughput random data access. However, an on-chip BRAM on one FPGA chip is much smaller than a large graph. One effective approach to providing more on-chip BRAM resources is a multi-FPGA structure. However, most FPGA-based systems nowadays are designed for a FPGA board or need a globally accessible memory, thus are inferior in scalability. While the existing multi-card systems have been improved in terms of graph partitioning distribution and data task assignment, they are still not satisfying for their insufficient on-chip resources and high communication overhead, leaving technical challenges about large graphs in terms of performance and scalability unsolved. Additionally, a multi-FPGA graph processing system has the following disadvantages. First, synchronization of data across graph areas between FPGAs caused by graph partitioning requires high communication overhead. Besides, an FPGA usually has more than one hundred processing units, so the computing efficiency is low if there is not a good scheme for task assignment. Thus, the cost for the existing multi-FPGA graph processing systems to achieve load balance between FPGAs is additional communication overhead. Therein, the event overhead required by synchronous communication are even more than the processing time, leading to a low computation-to-communication ratio, and in turn less scalability and limited performance of the systems.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

To address the shortcomings of the prior art, the present invention provides a graph processing optimization method based on multi-FPGA accelerator interconnection, which is not about being particular to load balance between FPGAs but fully considers locality of graphs, thereby achieving load balance while reducing unnecessary communication between FPGAs. According to researches, undue pursuit of load balance can introduce unnecessary communication overhead and lower the computation-to-communication ratio. Instead, this can degrade the overall performance of the system. Therefore, the inventor have comprehensively pondered on the relationship between the high communication overhead and system performance caused by the introduction of load balance, and managed a trade-off therebetween, thereby devising a graph processing system having improved overall processing performance. Secondary, since an FPGA itself has a large number of compute units, dynamic task assignment among these compute units perform can speed up processing, thereby shorting the waiting time of the load imbalance calculation and improving the overall processing speed.

According to the present invention, in the stage of graph partitioning, the point is to satisfy the locality of the graph to be processed and minimize the number of cut edges without pursuing ultimate load balance. The first step is to figuring out a criterion about how the number of cut edges and the number of load-imbalanced edges after graph partitioning affect the performance, and to consider the relationship between the improvement in performance caused and the communication overhead introduced by achievement of load balance, thereby partitioning the graph with the greatest possible efficiency. Then in the stage of graph processing, load balance between processing units in the FPGA is achieved by means of task stealing through dynamic task assignment, so as to enhance processing efficiency and computing speed of the FPGA system, thereby shortening the time to wait before the load imbalance magnitude between FPGAs is figured out, and compensating the minor load imbalance formed in the stage of graph partitioning. Besides, the present invention employs a memory nested dissection scheme between graph partitioning and graph processing to provide granularity match between sub-graph partitioning and processing, thereby optimizing data placement and speeding up memory access. Thus, the present invention can maintain system performance while reducing overhead for communication between FPGAs. With its tradeoff between improved performance and reduced communication overhead, the present invention optimizes the overall performance of the system.

Hence, the present invention provides a graph processing optimization method based on multi-FPGA accelerator interconnection, being configured to perform graph processing on graph data using a distributed computing system that introduces at least two FPGA accelerators and enables mutual communication between the at least two FPGA accelerators in such a way that relationship between inter-accelerator communication overhead and processing performance inside each said FPGA accelerator is considered; the optimization method comprising: inputting the graph data into a pre-processing module; making the pre-processing module partitioning the graph data into a plurality of sub-graph data in such a way that ultimate load balance between the FPGA accelerators is not pursued based on locality of the graph data, and storing the sub-graph data into an intermediate storage, making the at least two FPGA accelerators read the sub-graph data from the intermediate storage and perform graph processing on the sub-graph data by means of dynamic task assignment so as to obtain the computing result; the pre-processing module partitioning the graph data into the plural sub-graph data that make loads of the FPGA accelerators have local imbalance therebetween based on the locality of the graph data in such a way that communication overhead are reduced, and a processing unit in each said FPGA accelerator being able to, when a distributed graph processing sub-system is established between the at least two FPGA accelerators, perform dynamic graph processing on the sub-graph data stored in the intermediate storage by dynamically compensating local load imbalance formed during division of the sub-graph data, so that the method is able to save the communication overhead based on the locality of the graph data by estimating relationship between performance improvement achieved when substantial load balance exists between the FPGA accelerators and communication overhead thereby introduced and is able to allow the FPGA accelerators to perform the dynamic graph processing on the plural sub-graph data with local load imbalance therebetween.

According to a preferred mode, the pre-processing module determines at least one partition point by traversing the graph data in such a way that communication overhead are reduced, so that when the pre-processing module uses the at least one partition point as a boundary point to pre-partition the graph data into at least two sub-graph data, the pre-processing module determines whether the pre-partitioning saves communication overhead through steps of: calculating a difference between numbers of edges of the at least two sub-graph data, so as to determine a waiting time for which at least one of the sub-graph data waits for the local FPGA accelerator to process it; calculating a number of common vertices shared by the at least two sub-graph data, so as to determine a communication time required by the local FPGA accelerator and the other said FPGA accelerator that is in an idle state jointly process the at least two sub-graph data; and if the waiting time is smaller than the communication time, the pre-processing module using the partition point as a boundary point to partition the graph data into the sub-graph data in such a way that communication overhead are reduced.

According to a preferred mode, when the pre-processing module has partitioned the graph data into the at least two sub-graph data, the pre-processing module creates a corresponding duplicate point for the at least one partition point and links the duplicate point to the corresponding at least one sub-graph data, so that the at least one FPGA accelerator is able to perform the synchronous data processing on the at least two sub-graph data based on mapping relationship between the partition point and its corresponding duplicate point while performing graph processing on the at least two sub-graph data with local load imbalance in such a way that communication overhead are reduced.

According to a preferred mode, the FPGA accelerator obtains a computing result based on the sub-graph data through steps of: portioning each said sub-graph data into a plurality of sub-tasks, and placing at least one of the a plurality of sub-tasks into at least one processing element belonging to an identical compute unit in the FPGA accelerator in a form of at least one task queue, so as to maintain load balance between the processing elements by means of fine-grained task assignment. When the at least one processing element has completed the corresponding at least one task queue, the internal processing element is able to steal at least one task queue that is in other internal processing elements of the compute unit it belongs to and has not been processed, so that when the compute unit has completed processing the sub-graph data, the compute unit is able to steal the sub-graph data that have not been processed, thereby compensating a local load imbalance magnitude between the at least two FPGA accelerators formed during a process of partitioning the sub-graph data based on the locality of the graph data.

According to a preferred mode, further partitioning the sub-graph data that were partitioned according to the locality of the graph data based on random storage properties of an on-chip BRAM of the FPGA accelerator for vertices data into sub-blocks that match a size of the on-chip BRAM memory, so that the sub-blocks are suitable to be stored in corresponding storage units, thereby in a condition that the sub-blocks are able to pass through a DRAM and the on-chip BRAM successively and then get stored in a parallel manner in virtue of a memory structure inside the FPGA accelerators, the compute unit being able to access the sub-graph data without crossing the compute units by directly accessing a corresponding local memory while ensuring the locality of the graph data, so that a task assignment sub-module is able to perform the dynamic task assignment on the graph data according to the load imbalance magnitude between the at least two FPGA accelerators and a processing speed of the compute units in each said FPGA accelerator so as to realize the dynamic graph processing of the graph data.

According to a preferred mode, the at least two FPGA accelerators communicate with each other by means of interconnection, and each said FPGA accelerator is able to connect a network switch in such a way that the sub-graph data are transmitted through a network IP core, in which the network switches are connected to each other so as to allow exchange of processing information between the FPGA accelerators, so that the FPGA accelerators are able to read the sub-graph data from the intermediate storage and perform graph processing on the sub-graph data with reduced communication overhead and without communicative functions of physical and media access layers.

According to a preferred mode, the present invention provides a graph processing optimization system based on multi-FPGA accelerator interconnection, being configured to perform graph processing on graph data using a distributed computing system that introduces at least two FPGA accelerators and enables mutual communication between the at least two FPGA accelerators in such a way that relationship between inter-accelerator communication overhead and processing performance inside each said FPGA accelerator is considered; the optimization system comprising: a pre-processing module, for receiving the graph data, and is able to partition the graph data into a plurality of sub-graph data based on locality of the graph data in such a way that ultimate load balance between the FPGA accelerators is not pursued; an intermediate storage, for storing the plural sub-graph data; and at least two FPGA accelerators, being in communicative connection with each other and forming a distributed graph processing sub-system, for reading the sub-graph data from the intermediate storage and performing graph processing on the sub-graph data by means of dynamic task assignment, so as to obtain a computing result. The pre-processing module partitions the graph data into the plural sub-graph data that make loads of the FPGA accelerators have local imbalance therebetween based on the locality of the graph data in such a way that communication overhead are reduced, and a processing unit in each said FPGA accelerator is able to, when a distributed graph processing sub-system is established between the at least two FPGA accelerators, perform dynamic graph processing on the sub-graph data stored in the intermediate storage by dynamically compensating local load imbalance formed during division of the sub-graph data, so that the method is able to save the communication overhead based on the locality of the graph data by estimating relationship between performance improvement achieved when substantial load balance exists between the FPGA accelerators and communication overhead thereby introduced and is able to allow the FPGA accelerators to perform the dynamic graph processing on the plural sub-graph data with local load imbalance therebetween.

According to a preferred mode, in the system, the pre-processing module determines the at least one partition point in such a way that communication overhead are reduced while traversing the graph data, so that when the pre-processing module uses the at least one partition point as the boundary point to pre-partition the graph data into the at least two sub-graph data, the pre-processing module to determines whether the pre-partitioning saves communication overhead through steps of: calculating a difference between numbers of edges of the at least two sub-graph data, so as to determine a waiting time for which at least one of the sub-graph data waits for the local FPGA accelerator to process it; calculating a number of common vertices shared by the at least two sub-graph data, so as to determine a communication time required by the local FPGA accelerator and the other said FPGA accelerator that is in an idle state jointly process the at least two sub-graph data; and; if the waiting time is smaller than the communication time, the pre-processing module using the partition point as a boundary point to partition the graph data into the sub-graph data in such a way that communication overhead are reduced.

According to a preferred mode, the present invention provides a sub-graph data accessing method for distributed graph processing using multiple FPGA accelerators, allowing at least two FPGA accelerators to read sub-graph data of corresponding on-chip BRAMs thereof, so that compute units in the FPGA accelerators are able to read sub-graph data of the corresponding on-chip BRAMs thereof without access crossing processing units; the method comprising: storing the portioned sub-graph data into a corresponding intermediate storage, communicatively connecting the FPGA accelerators and the intermediate storage, so that the FPGA accelerators are allowed to read the sub-graph data, the sub-graph data accessing method comprising: further partitioning the sub-graph data that were partitioned according to the locality of the graph data based on random storage properties of an on-chip BRAM of the FPGA accelerator for vertices data into sub-blocks that match a size of the on-chip BRAM memory, so that the sub-blocks are suitable to be stored in corresponding storage units, thereby in a condition that the sub-blocks are able to pass through a DRAM and the on-chip BRAM successively and then get stored in a parallel manner in virtue of a memory structure inside the FPGA accelerators, the compute unit being able to access the sub-graph data without crossing the compute units by directly accessing a corresponding local memory while ensuring the locality of the graph data, so that a task assignment sub-module is able to perform the dynamic task assignment on the graph data according to the load imbalance magnitude between the at least two FPGA accelerators and/or a processing speed of the compute units in each said FPGA accelerator so as to realize the dynamic graph processing of the graph data.

According to a preferred mode, the present invention provides a task assignment method for based on graph data using multiple FPGA accelerators, being applicable to a graph processing system having at least two FPGA accelerators, for dynamically compensating a local load imbalance magnitude between the at least two FPGA accelerators formed during a process of partitioning sub-graph data based on locality of the graph data by modulating load balance between processing elements of compute units in each said FPGA accelerator. the task assignment method comprises: portioning each said sub-graph data into a plurality of sub-tasks, and placing at least one of the plurality of sub-tasks into at least one processing element belonging to an identical compute unit in the FPGA accelerator in a form of at least one task queue, so as to maintain load balance between the processing elements by means of fine-grained task assignment, when the at least one processing element has completed the corresponding at least one task queue, the internal processing element is able to steal at least one task queue that is in other internal processing elements of the compute unit it belongs to and has not been processed, so that when the compute unit has completed processing the sub-graph data, the compute unit is able to steal the sub-graph data that have not been processed, thereby compensating a local load imbalance magnitude between the at least two FPGA accelerators (100) formed during a process of partitioning the sub-graph data based on the locality of the graph data.

The graph processing optimization method based on multi-FPGA accelerator interconnection of the present invention addresses the problems such as the low computation-to-communication ratio in graph environments, and high communication overhead as well as load imbalance in heterogeneous environments for graph processing, with the objective to reduce communication overhead between accelerators by optimizing graph partitioning so as to improve system scalability. In virtue of its dynamic task assignment method, load balance between accelerators can be achieved, so as to enhance computing performance. The present invention also coordinate locality and parallelism of a graph, and uses graph data partitioning, organization and task assignment under an optimized multi-FPGA interconnection structure to accomplish optimal tradeoff between high-performance sub-graph partitioning and high-speed operation.

DETAILED DESCRIPTION OF THE INVENTION

Figure 1:
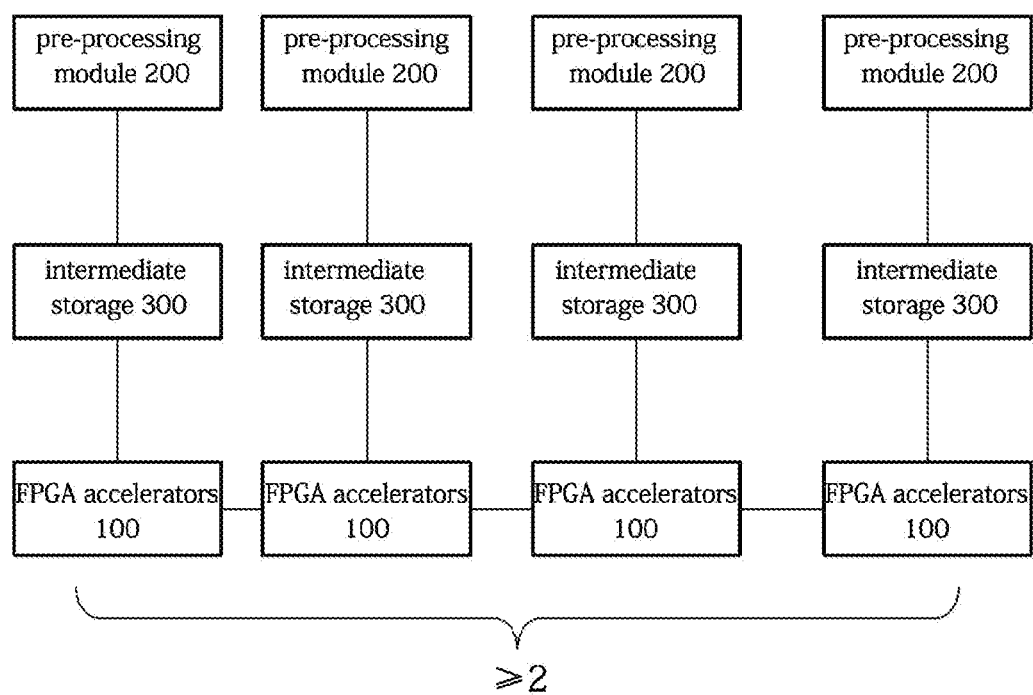
FIG. 1 is a schematic diagram of a distributed graph processing system according to the present invention.

The invention as well as a preferred mode of use, further objectives and advantages thereof will be best understood by reference to the following detailed description of illustrative embodiments when read in conjunction with FIGS. 1 through 6.

For clarity, some technical terms used in this document are defined as below:
FPGA—field-programmable gate array
BRAM—block random access memory
DRAM—dynamic random access memory PE—processing element FPGA chip—field-programmable gate array chip Private Memory—private memory Off-chip memory—Off-chip memory (intermediate storage)

RDMA—remote direct memory access structure, using a technology that access data in a memory of remote host without accessing the operating system core of the remote host, thereby providing improved system throughput and reduced network communication latency, making it suitable for large-scale parallel computer clusters.

Embodiment 1

Interval-shard partitioning based on shared memories is not suitable for a multi-FPGA structure in the respect of load balance and scalability for having the following disadvantages. First, frequent switching among memory sub-blocks leads to additional on-chip and/or off-chip data transmission, and increases bandwidth overhead. Second, even the sub-blocks that only contain a few edges have to be loaded to processing units, and this degrades the overall computing performance. Third, the edges whose sources are located in the same sub-interval are sent to same processing unit, while the other processing elements are in idle state, making the resource efficiency of the processing units low.

The present embodiment provides a graph processing optimization method based on multi-FPGA interconnection. First, the present embodiment provides a low-overhead, high-efficiency graph partitioning method, which maintains load balance between FPGAs with reduced communication overhead. The present invention also performs dynamic task assignment on internal processing elements, thereby improving FPGA local computing resources efficiency. For optimal system performance, the present embodiment adopts the optimized memory placement scheme to better link graph partitioning and local computation so the optimized system has good scalability.

To a distributed computing system that introduces at least two FPGA accelerators and have the at least two FPGA accelerators communicated with each other, the disclosed method uses task stealing to leverage the local computing resources in FPGAs. If the processing time for load imbalance in the local FPGA accelerator is smaller than the processing time for distributed processing, sub-graph data are held locally to wait for its corresponding local FPGA accelerator, but not dealt with distributed processing that involves communication between the two FPGA accelerators. This method provides load balance between the FPGA accelerators while balancing communication overhead and processing capacity of the local FPGA accelerator, so as to enhance graph processing efficiency. In particular, graph data processing is performed in such a way that relationship between inter-accelerator communication overhead and processing performance inside each said FPGA accelerator is considered and in such a way that ultimate load balance between the at least two FPGA accelerators is not pursued. The present invention employs low-overhead graph partitioning and high-performance work stealing to realize load balance and parallelism across and within FPGAs, thereby using the minimal possible communication overhead to realize the maximum possible improvement in performance.

According to the optimization method, in the multi-FPGA graph processing system assisted by work stealing, locality of graph partitioning and parallelism of graph data processing are two critical factors for system performance. Therefore, the present invention compensates local imbalance by means of task assignment without pursuing ultimate load balance between the at least two FPGA accelerators 100 during graph partitioning. The optimization method comprising:

S1: inputting graph data into a pre-processing module 200;

S2: making the pre-processing module 200 partitioning the graph data into a plurality of sub-graph data in such a way that ultimate load balance between the FPGA accelerators 100 is not pursued based on locality of the graph data, S3: storing the sub-graph data into an intermediate storage 300, and S4: making the at least two FPGA accelerators 100 read the sub-graph data from the intermediate storage 300 and perform graph processing on the sub-graph data by means of dynamic task assignment so as to obtain the computing result.

Preferably, in Step S2, the pre-processing module 200 partitions the graph data into the plural sub-graph data that make loads of the FPGA accelerators 100 have local imbalance therebetween based on the locality of the graph data in such a way that a first time sum of the processing time and waiting-for-processing time of the FPGA accelerators 100 is smaller than a second time sum of the distributed processing time and the communication time. The processing time of the FPGA accelerator 100 is determined by the compute units therein. The waiting-for-processing time is determined by the number of edges contained in the sub-graph data and the processing speed. The distributed processing time is determined by the processing speed of the FPGA accelerator 100. The communication time is determined by the data amount contained in the weak node for partitioning and the communication bandwidth. Accordingly, the processing units in each of the FPGA accelerators 100 is able to, when a distributed graph processing sub-system is established between the at least two FPGA accelerators 100, perform dynamic graph processing on the sub-graph data stored in the intermediate storage 300 by dynamically compensating local load imbalance formed during division of the sub-graph data. In this way, the present invention preserves the natural locality of actual graph data, so that the processing resources in the FPGA accelerators can be used to access the intermediate storage 300 faster. Additionally, the present invention enhances local computing efficiency by optimizing work stealing. The partitioning method of the present invention fully considers parallelism between FPGAs, thereby ensuring scalability of the graph processing system without increasing communication overhead.

Figure 2:
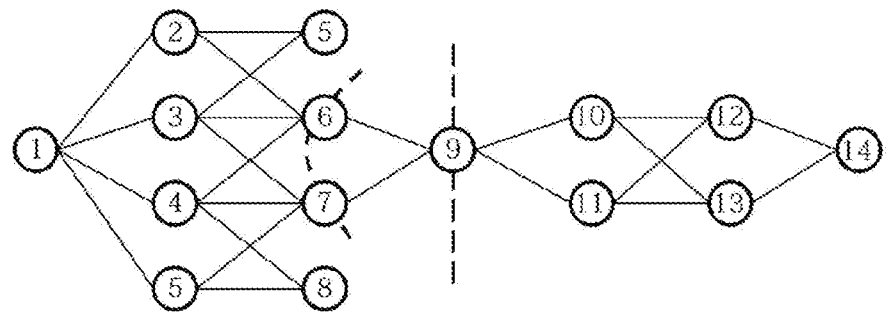
FIG. 2 is a structural chart of graph data according to the present invention.
Figure 3:
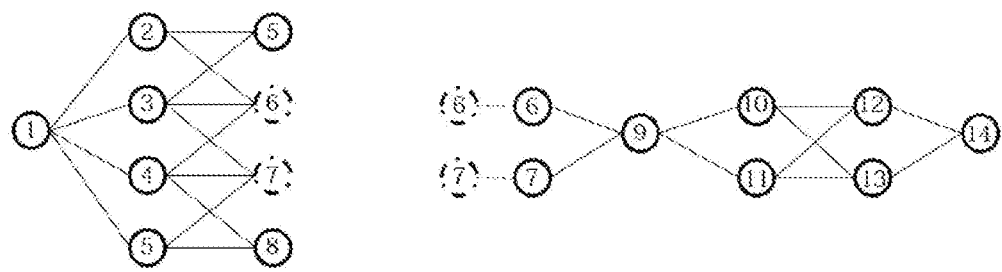
FIG. 3 is a structural chart of sub-graph data formed using a cutting method according to the present invention.
Figure 4:
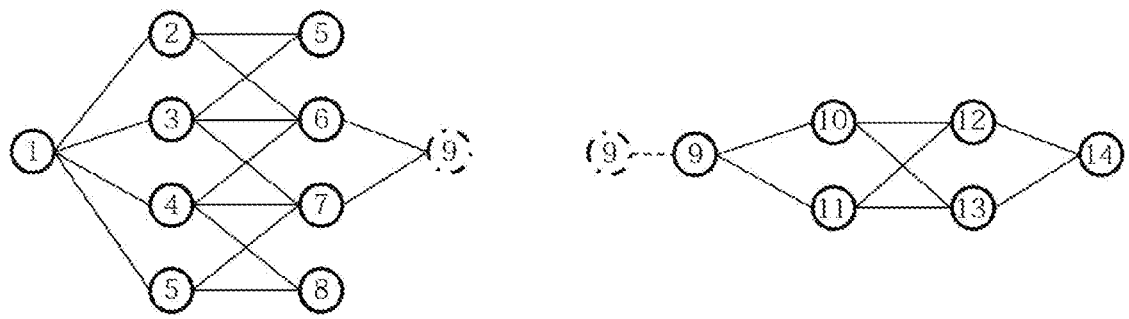
FIG. 4 is a structural chart of sub-graph data formed using another cutting method according to the present invention.

Preferably, the pre-processing module 100 determines at least one partition point while traversing the graph data. The partition point is a weak-tie vertex. The pre-processing module 100 first traverses the graph data, and evenly partitions the graph data into sub-graph data based on the hash algorithm. Then the pre-processing module 100 performs traversal at the partitioning boundary to find a weak-tie vertex (the connecting vertex having fewer edges). Afterward, the pre-processing module 100 uses the at least one partition point as the boundary point to pre-partition the graph data into at least two sub-graph data. For example, as shown in FIGS. 2-4, vertices 6, 7 and 9 are each a qualified partition point. The pre-processing module 100 may partition the graph data of FIG. 2 in the way as depicted in FIG. 3 or FIG. 4. The pre-processing module 100 determines whether the pre-partitioning saves communication overhead by figuring out the relationship between the improvement in performance caused by and the communication overhead introduced by substantial load balance. The pre-processing module 100 calculates the difference of the numbers of edges between the at least two sub-graph data. As shown in FIG. 3, the two sub-graph data have 14 and 10 edges, respectively, so the edge difference is 4. In other words, the processing time for the two sub-graph data to be processed by the local FPGA accelerator 100 is 4 units of time. The time difference is recorded as the waiting time. The edge difference is why local load imbalance exists between FPGAs for sub-graph data processing. The number of the vertices shared by at least two sub-graph data is calculated. As shown in FIG. 3, the two sub-graph data share two vertices. If the two sub-graph data are parallelly processed by two FPGA accelerators (without waiting), since data at the two partition points have to be exchanged to ensure data integrity, 2 communication overheads are required, and the time required by the two communication overheads is the communication time, which is also related to the communication bandwidth. The pre-processing module 100 compares the foregoing pre-partitioning waiting time with the communication time. If the waiting time is smaller than the communication time, the pre-processing module 100 uses partition points 6, 7 as the boundary point to partition the graph data into sub-graph data and sends the sub-graph data to the local FPGA accelerator for processing, not instead sending them to the remote FPGA accelerator through remote communication, so as to reduce communication costs for sub-graph data processing.

Preferably, after the pre-processing module 100 partitions the graph data into at least two sub-graph data, the pre-processing module 100 creates a corresponding duplicate point for the at least one partition point and links the duplicate point to the corresponding at least one sub-graph data. As shown in FIG. 3, after the graph data of FIG. 2 are partitioned into two sub-graph data, for ensuring integrity of each of the sub-graph data and relation of the sub-graph data, corresponding duplicate points (6 and 7 in the dotted frame) are created for the partition points 6, 7, and the duplicate points are linked to the corresponding at least one sub-graph data. Thereby, when performing graph processing on the at least two sub-graph data, the at least one FPGA accelerator 100 can perform synchronous data processing on at least two sub-graph data with local load imbalance based on mapping relationship between the partition points and their corresponding duplicate points in such a way that communication overhead are reduced. Since not all graph data after partitioned into sub-graph data satisfy the condition that the waiting time is smaller than communication time, creation of the duplicate points is also favorable to communication overhead saving. Taking the sub-graph data as shown in FIG. 3 as an example, if the communication time is shortened by means of increasing the bandwidth, it is possible that the communication time becomes smaller than the waiting time. In such a case, the two sub-graph data may be processed in the local FPGA accelerator and in the remote FPGA accelerator, respectively. At this time, without creation of the corresponding duplicate points, one problem is that some sub-graph data may lose data that connect vertices and this can cause errors occur during data computing, and another problem is that the local FPGA accelerator and the remote FPGA accelerator have to exchange data that connect vertices, and this leads to one or more additional communication overheads. Therefore, creation of duplicate points is helpful to reduce communication overhead while ensuring accuracy of results of graph data computation.

Figure 6:
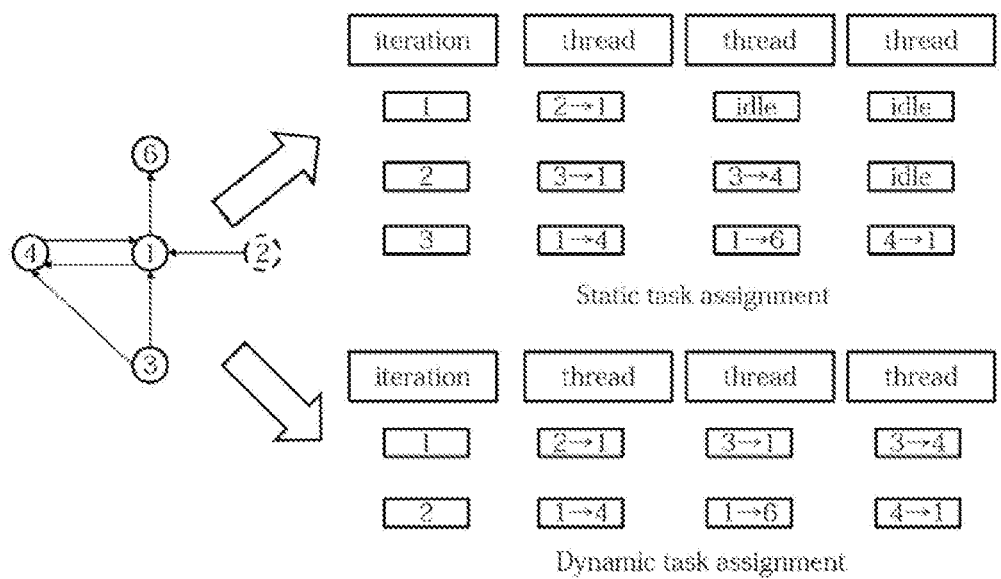
FIG. 6 is a schematic diagram illustrating task stealing according to the present invention.

In a multi-core distributed graph processing system, the major issue to be addressed is load balance between FPGA accelerator vertices. However, in a multi-FPGA accelerator processing system, load balance between compute units in FPGA accelerators is also important, for it not only improves processing efficiency of individual FPGAs, but also facilitates compensation of local load imbalance between FPGA accelerators formed during graph partitioning due to local differences of graph data, thereby enhancing processing performance from the inside out. Without task assignment, as the static processing scheme as shown in FIG. 6 (static task assignment), the waiting time across processing elements caused by load imbalance can lead to serious waste of computing resources and degradation of FPGA processing efficiency. Therefore, load balance between and within FPGAs are both important to performance of a multi-FPGA graph processing system. After the stage of graph partitioning, the sub-graph data are stored in the intermediate storage 300 (a global memory and a constant memory) between the FPGAs and wait for processing. In order to nullify that influence caused by local load imbalance between the FPGA processors during partitioning, dynamic task assignment is performed on the computing processing elements in the FPGAs, thereby shortening the waiting time the sub-graph data need between FPGAs. As shown in FIG. 6, preferably, the FPGA accelerator 100 acquires computing results based on the sub-graph data through the following steps:

S41: partitioning a whole piece of sub-graph data into a plurality of sub-tasks;

S42: placing at least one of the sub-tasks to at least one processing element in an identical compute unit in the FPGA accelerator so as to form at least one task queue, thereby maintaining load balance between the processing elements by means of fine-grained task assignment, wherein every work item keeps its own task queue, and the processing element completes its sub-tasks first steals sub-tasks from other task queues; and S43: when the at least one processing element has completed the corresponding at least one task queue, the internal processing element is able to steal at least one task queue that is in other internal processing elements of the compute unit it belongs to and has not been processed, so that when the compute unit has completed processing the sub-graph data, the compute unit is able to steal the sub-graph data that have not been processed, thereby compensating a local load imbalance magnitude between the at least two FPGA accelerators 100 formed during a process of partitioning the sub-graph data based on the locality of the graph data. Using work stealing to perform dynamic task assignment so as to eliminate the waiting time between the processing elements and enhance computing efficiency as compared to static pre-partitioning. Such a solution can also speed up local processing and shorten the waiting time between FPGAs, thereby enhancing the overall performance of the graph processing system. In addition, work stealing designed for memory access of the work load is advantageous because all works in the same group are shared and can access the same on-chip BRAM but not the remote memory. Through contiguous data distribution in the system, memory access efficiency and processing efficiency can be improved. Also referring to FIG. 6, during static processing, FPGA threads wait to the assigned data to be processed and those with fewer thread tasks stay idle to wait for the threads still working, thus causing waste of resources. Dynamic processing is about assigning tasks/data to the threads that have finished their tasks and become idle, so can improve efficiency and speed up processing. By comparison, all the tasks can be finished in only two iterations.

Figure 5:
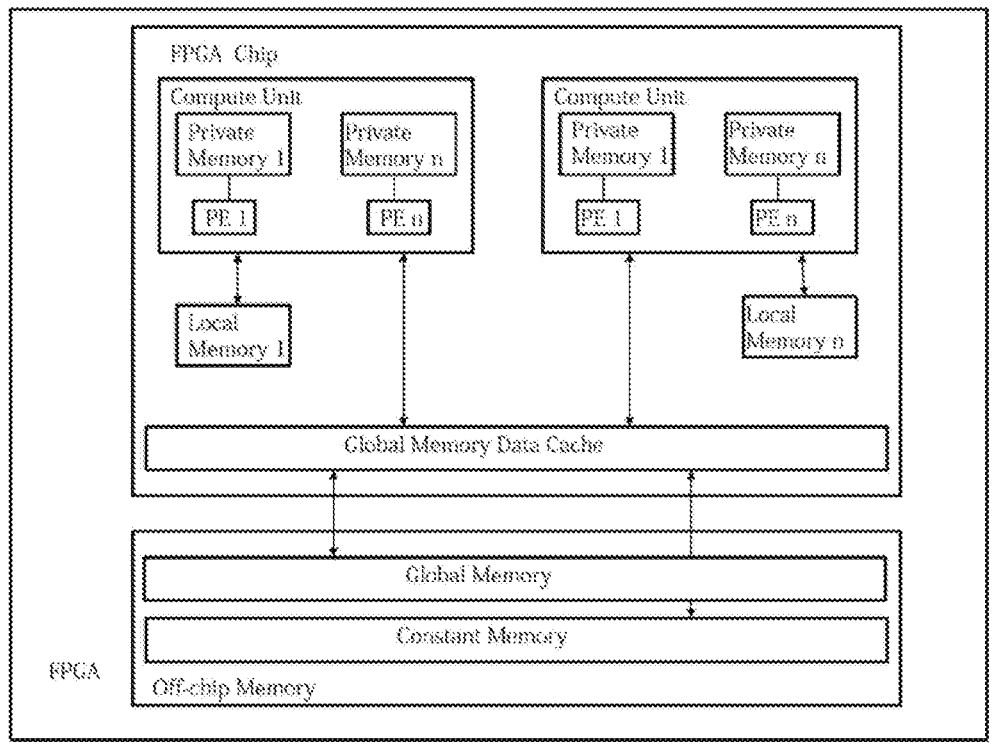
FIG. 5 is a logic diagram of memory access according to the present invention.

Preferably, the FPGA accelerator has a multi-layer memory structure, including, for example, a private memory, a local memory, and a global memory. Reading data from or writing data into a remote memory can increase communication overhead. The present invention distributes contiguous data to the same memory, so as to reduce the time in which the compute units of the FPGA accelerator 100 access remote memories. Thereby, the present invention can perform dynamic task assignment on the compute units of the FPGA accelerators 100, so as to improve the computing efficiency of the FPGA accelerators 100 and the processing efficiency of the entire system. This provides the possibility of setting the waiting time for the FPGAs related to load imbalance caused by graph partitioning. The present invention combines coarse-grained task stealing and partitioning to enhance the processing efficiency of FPGAs. FIG. 5 shows a preferred structure for accessing sub-graph data. In an FPGA chip, every compute unit is provided with at least one private memory, and every private memory is connected to a processing element PE. Moreover, every compute unit is further connected to a local memory and a global memory data cache. A global memory and a constant memory are provided outside the FPGA chip. The global memory global memory and the constant memory are connected to the global memory data cache, respectively. In such a memory accessing structure, the chip does not access the global memory directly. Instead, it accesses the global memory through the cache access. Thus, memory access will be more efficient if the work items are operated in the same cache. For relatively low latency and relatively high bandwidth, it is better to access a local memory than a remote memory, so as to reduce the costs for accessing a local memory to the maximum extent. Therefore, having work items of the same working group operated in the contiguous memories is helpful to enhance memory access efficiency.

The FPGA accelerator 100 reads sub-graph data from the intermediate storage 300 through the following steps: further partitioning the sub-graph data that were partitioned according to the locality of the graph data based on random storage properties of an on-chip BRAM (forming a local memory) of the FPGA accelerator 100 for vertices data into sub-blocks that match a size of the on-chip BRAM memory, so that the sub-blocks are suitable to be stored in corresponding storage units, thereby in a condition that the sub-blocks are able to pass through a DRAM (forming a global memory) and the on-chip BRAM successively and then get stored in a parallel manner in virtue of a memory structure inside the FPGA accelerators, the computing unit being able to access the sub-graph data without crossing the computing units by directly accessing a corresponding local memory while ensuring the locality of the graph data, so that a task assignment sub-module is able to perform the dynamic task assignment on the graph data according to the load imbalance magnitude between the at least two FPGA accelerators 100 and/or a processing speed of the computing units in each said FPGA accelerator 100 so as to realize the dynamic graph processing of the graph data. Also referring to FIG. 5, in Step 1, a whole piece of graph data needs to be, partitioned into several sub-graph data before placed on different FPGAs for distributed processing (for both speed and storage capacity). In Step 2, the sub-graph data partitioned in Step 1 are placed into memory layers of different sizes in the FPGA such that the data positionally adjacent to each other in the graph are placed into the same layer, thereby speeding up memory access. Step 3 is about sub-graph scheduling, which involves processing the partitioned and stored graph data in the FPGA, accelerating the processing by means of thread dynamic task assignment, and compensating the imbalanced task magnitude caused by the partitioning of Step 1.

Preferably, the foregoing interconnection between the at least two FPGA accelerators 100 is achieved through network communication. Every FPGA accelerator is connected to a network switch such that the sub-graph data are transmitted through the network IP core. The network switches are connected to each other so as to allow exchange of processing information between the FPGA accelerators 100, so that the FPGA accelerators 100 are able to read the sub-graph data from the intermediate storage 300 and perform graph processing on the sub-graph data with reduced communication overhead and without communicative functions of physical and media access layers. Preferably, the communication means used in the present invention is Ethernet and the network switches are Ethernet switches. Alternatively, the at least two FPGA accelerators 100 perform remote direct memory access using the RDMA technology.

With the disclosed method, in virtue of the use of dynamic task assignment, graph data processing efficiency can be improved by about 1.5 times as compared to processing without using dynamic task assignment (three iterations vs. two iterations). This means a 1.5-time improvement in parallelism. Consequently, the communication overhead is only 0.67 time, equal to a save of one third and the scalability is improved to be about 1.4 time as compared to the prior art.

Embodiment 2

The present embodiment provides further improvements to Embodiment 1, and what is identical to its counterpart in the previous embodiment will not be repeated in the following description. Without causing conflict or contradiction, the entire and/or part of preferred modes of other embodiments may be incorporated into the present embodiment as supplements.

A graph processing optimization system based on multi-FPGA accelerator interconnection is configured to perform graph processing on graph data using a distributed computing system that introduces at least two FPGA accelerators and enables mutual communication between the at least two FPGA accelerators in such a way that relationship between inter-accelerator communication overhead and processing performance inside each said FPGA accelerator is considered in such a way that ultimate load balance between the FPGA accelerators 100 is not pursued.

The pre-processing module 200 receives the graph data, and is able to partition the graph data into a plurality of sub-graph data based on locality of the graph data in such a way that ultimate load balance between the FPGA accelerators 100 is not pursued.

The intermediate storage 300 stores the sub-graph data.

At least two FPGA accelerators 100 are in communicative connection with each other and form a distributed graph processing sub-system, for reading the sub-graph data from the intermediate storage 300 and performing graph processing on the sub-graph data by means of dynamic task assignment, so as to obtain a computing result.

The pre-processing module 200 partitions the graph data into the plural sub-graph data that make loads of the FPGA accelerators 100 have local imbalance therebetween based on the locality of the graph data in such a way that a first time sum of the processing time and waiting-for-processing time of the FPGA accelerators 100 is smaller than a second time sum of the distributed processing time and the communication time. Accordingly, the processing units in each of the FPGA accelerators 100 is able to, when a distributed graph processing system is established between the at least two FPGA accelerators 100, perform dynamic graph processing on the sub-graph data stored in the intermediate storage 300 by dynamically compensating local load imbalance formed during division of the sub-graph data. In this way, the present invention can save the pre-processing time and communication time for partitioning the graph data into a plurality of sub-graph data and can allow the FPGA accelerators 100 to perform the dynamic graph processing on the plural sub-graph data with local load imbalance therebetween in such a way that ultimate load balance between the FPGA accelerators 100 is not pursued by estimating relationship between performance improvement achieved when substantial load balance exists between the FPGA accelerators 100 and communication overhead thereby introduced.

Embodiment 3

The present embodiment provides further improvements to Embodiments 1 and/or 2, and what is identical to its counterpart in the previous embodiment will not be repeated in the following description. Without causing conflict or contradiction, the entire and/or part of preferred modes of other embodiments may be incorporated into the present embodiment as supplements.

A sub-graph data accessing method for distributed graph processing using multiple FPGA accelerators allows at least two FPGA accelerators to read sub-graph data of corresponding on-chip BRAMs thereof, so that compute units in the FPGA accelerators are able to read sub-graph data of the corresponding on-chip BRAMs thereof without access crossing processing units.

The method comprises:
storing the portioned sub-graph data into a corresponding intermediate storage 300,
communicatively connecting the FPGA accelerators and the intermediate storage 300, so that the FPGA accelerators 100 are allowed to read the sub-graph data, the sub-graph data accessing method comprising:
further partitioning the sub-graph data that were partitioned according to the locality of the graph data based on random storage properties of an on-chip BRAM of the FPGA accelerator 100 for vertices data into sub-blocks that match a size of the on-chip BRAM memory, so that the sub-blocks are suitable to be stored in corresponding storage units, thereby in a condition that the sub-blocks are able to pass through a DRAM and the on-chip BRAM successively and then get stored in a parallel manner in virtue of a memory structure inside the FPGA accelerators, the compute unit being able to access the sub-graph data without crossing the compute units by directly accessing a corresponding local memory while ensuring the locality of the graph data, so that a task assignment sub-module is able to perform the dynamic task assignment on the graph data according to the load imbalance magnitude between the at least two FPGA accelerators 100 and/or a processing speed of the compute units in each said FPGA accelerator 100 so as to realize the dynamic graph processing of the graph data.

Embodiment 4

The present embodiment provides further improvements to Embodiments 1, 2 and/or 3, and what is identical to its counterpart in the previous embodiment will not be repeated in the following description. Without causing conflict or contradiction, the entire and/or part of preferred modes of other embodiments may be incorporated into the present embodiment as supplements.

The present embodiment is about a task assignment method for graph data based on multiple FPGA accelerators. The method is applicable to a graph processing system having at least two FPGA accelerators 100, for dynamically compensating a local load imbalance magnitude between the at least two FPGA accelerators 100 formed during a process of partitioning sub-graph data based on locality of the graph data by modulating load balance between processing elements of compute units in each said FPGA accelerator 100.

The task assignment method comprises: portioning each said sub-graph data into a plurality of sub-tasks, and placing at least one of the plurality of sub-tasks into at least one processing element belonging to an identical compute unit in the FPGA accelerator in a form of at least one task queue, so as to maintain load balance between the processing elements by means of fine-grained task assignment. When the at least one processing element has completed the corresponding at least one task queue, the internal processing element is able to steal at least one task queue that is in other internal processing elements of the compute unit it belongs to and has not been processed, so that when the compute unit has completed processing the sub-graph data, the compute unit is able to steal the sub-graph data that have not been processed, thereby compensating a local load imbalance magnitude between the at least two FPGA accelerators (100) formed during a process of partitioning the sub-graph data based on the locality of the graph data.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A graph processing optimization method based on multi-FPGA accelerator interconnection, being configured to perform graph processing on graph data for a distributed computing system that introduces at least two FPGA accelerators and enables mutual communication between the at least two FPGA accelerators, where a relationship between inter-FPGA-accelerator communication overhead and processing performance inside each of the at least two FPGA accelerators is weighed, wherein the optimization method comprises:
inputting graph data into a pre-processing module;
the pre-processing module partitioning the graph data into a plurality of sub-graph data based on locality of the graph data in such a way that ultimate load balance between the FPGA accelerators is not pursued, and storing the sub-graph data into an intermediate storage, the at least two FPGA accelerators reading the sub-graph data from the intermediate storage and performing graph processing on the sub-graph data by means of dynamic task assignment so as to obtain computing result;

the graph processing optimization method being characterized in that, the pre-processing module partitions the graph data into the plurality of sub-graph data that make loads of the FPGA accelerators have a local imbalance therebetween based on the locality of the graph data in such a way that communication overhead is reduced, and a processing unit in each of the FPGA accelerators is able to, when a distributed graph processing sub-system is established between the at least two FPGA accelerators, perform dynamic graph processing on the sub-graph data stored in the intermediate storage by dynamically compensating local load imbalance formed during partition of the sub-graph data, so that the optimization method is able to save the communication overhead based on the locality of the graph data by weighing relationship between performance improved by achieving substantial load balance between the FPGA accelerators and communication overhead thereby introduced and is able to allow the FPGA accelerators to perform the dynamic graph processing on the plurality of sub-graph data where there is local load imbalance between the FPGA accelerators, wherein the pre-processing module determines at least one partition point by traversing the graph data in such a way that communication overhead is reduced, so that when the pre-processing module uses the at least one partition point as boundary point to pre-partition the graph data into at least two sub-graph data, the pre-processing module determines whether the pre-partitioning saves communication overhead through the steps of:

calculating a difference between numbers of edges of the at least two sub-graph data, so as to determine a waiting time for which at least one of the sub-graph data waits for the local FPGA accelerator to process it;

calculating a number of common vertices shared by the at least two sub-graph data, so as to determine a communication time required by a local FPGA accelerator and another FPGA accelerator that is in an idle state to jointly process the at least two sub-graph data; and if the waiting time is smaller than the communication time, the pre-processing module using the partition point as a boundary point to partition the graph data into the sub-graph data in such a way that communication overhead is reduced; and when the pre-processing module has partitioned the graph data into the at least two sub-graph data, the pre-processing module creates a corresponding duplicate point for the at least one partition point and links the duplicate point to the corresponding at least one sub-graph data, so that the at least one FPGA accelerator is able to perform synchronous data processing on the at least two sub-graph data based on corresponding relationship between the partition point and its corresponding duplicate point while performing graph processing on the at least two sub-graph data with local load imbalance in such a way that communication overhead is reduced.

2. The optimization method of claim 1, wherein the FPGA accelerator obtains the computing result based on the sub-graph data through the steps of:

portioning each said sub-graph data into a plurality of sub-tasks, and placing at least one of the plurality of sub-tasks into at least one processing element belonging to an identical compute unit in the FPGA accelerator in a form of at least one task queue, so as to maintain load balance between the processing elements by means of fine-grained task assignment;

when the at least one processing element has completed the corresponding at least one task queue, the internal processing element is able to steal at least one task queue that is in other internal processing elements of the compute unit it belongs to and has not been processed, so that when the compute unit has completed processing the sub-graph data, the compute unit is able to steal the sub-graph data that have not been processed, thereby compensating a local load imbalance magnitude between the at least two FPGA accelerators formed during a process of partitioning the sub-graph data based on the locality of the graph data.

3. The optimization method of claim 2, wherein the FPGA accelerator reads the sub-graph data from the intermediate storage through the steps of:

further partitioning the sub-graph data that were partitioned according to the locality of the graph data into sub-blocks that match a size of the on-chip BRAM memory based on random storage properties of an on-chip BRAM of the FPGA accelerator for vertex data, so that the sub-blocks are suitable to be stored in corresponding storage units, such that the sub-blocks pass through a DRAM and the on-chip BRAM successively and then are stored in a parallel manner in a memory structure inside the FPGA accelerators, the compute unit is able to access the sub-graph data by directly accessing a corresponding local memory without crossing the compute units while ensuring the locality of the graph data, so that a task assignment sub-module is able to perform the dynamic task assignment on the graph data according to the load imbalance magnitude between the at least two FPGA accelerators and a processing speed of the compute units in each said FPGA accelerator so as to realize the dynamic graph processing of the graph data.

4. The optimization method of claim 3, wherein the at least two FPGA accelerators communicate with each other to achieve interconnection, and each of the at least two FPGA accelerators is connected to a network switch in such a way that the sub-graph data are transmitted through a network IP core, the network switches are connected to each other so as to allow exchange of processing information between the FPGA accelerators, so that the FPGA accelerators are able to read the sub-graph data from the intermediate storage and perform graph processing on the sub-graph data without communicative functions of physical and media access layers and with reduced communication overhead.

5. A graph processing optimization system based on multi-FPGA accelerator interconnection, being configured to perform graph processing on graph data for a distributed computing system that introduces at least two FPGA accelerators and enables mutual communication between the at least two FPGA accelerators where a relationship between inter-FPGA-accelerator communication overhead and processing performance inside each of the at least two FPGA accelerators is weighed, the optimization system comprising:

a pre-processing module, for receiving the graph data, and capable of partitioning the graph data into a plurality of sub-graph data based on a locality of the graph data in such a way that ultimate load balance between the FPGA accelerators is not pursued;
an intermediate storage, for storing the plural sub-graph data; and
the at least two FPGA accelerators, being in communicative connection with each other and forming a distributed graph processing sub-system, for reading the sub-graph data from the intermediate storage and performing graph processing on the sub-graph data by means of dynamic task assignment, so as to obtain a computing result;
the graph processing optimization system being characterized in that,
the pre-processing module partitions the graph data into the plurality of sub-graph data that make loads of the FPGA accelerators have a local imbalance therebetween based on the locality of the graph data in such a way that communication overhead are reduced, and a processing unit in each of the at least one FPGA accelerators is able to, when a distributed graph processing sub-system is established between the at least two FPGA accelerators, perform dynamic graph processing on the sub-graph data stored in the intermediate storage by dynamically compensating local load imbalance formed during partition of the sub-graph data, so that the system is able to save the communication overhead based on the locality of the graph data by weighing relationship between performance improved by achieving substantial load balance between the FPGA accelerators and communication overhead thereby introduced and is able to allow the FPGA accelerators to perform the dynamic graph processing on the plurality of sub-graph data where there is local load imbalance between the FPGA accelerators; and
wherein the pre-processing module determines at least one partition point by traversing the graph data in such a way that communication overhead are reduced, so that when the pre-processing module uses the at least one partition point as boundary point to pre-partition the graph data into at least two sub-graph data, the pre-processing module determines whether the pre-partitioning saves communication overhead through the steps of:
calculating a difference between numbers of edges of the at least two sub-graph data, so as to determine a waiting time for which at least one of the sub-graph data waits for the local FPGA accelerator to process it;
calculating a number of common vertices shared by the at least two sub-graph data, so as to determine a communication time required by the local FPGA accelerator and another FPGA accelerator that is in an idle state to jointly process the at least two sub-graph data; and
if the waiting time is smaller than the communication time, the pre-processing module is able to use the partition point as boundary point to partition the graph data into the sub-graph data in such a way that communication overhead are reduced.

6. A sub-graph data accessing method for distributed graph processing using multiple FPGA accelerators, allowing at least two FPGA accelerators to read sub-graph data of corresponding on-chip BRAMs thereof, so that compute units in the FPGA accelerators are able to read sub-graph data of the corresponding on-chip BRAMs thereof without access crossing processing units, the method comprising:
portioning graph data into a plurality of portioned sub-graph data based on locality of the graph data
storing the portioned sub-graph data into a corresponding intermediate storage; and
communicatively connecting the FPGA accelerators and the intermediate storage, so that the FPGA accelerators read the portioned sub-graph data from the intermediate storage and performing graph processing on the portioned sub-graph data by means of dynamic task assignment so as to obtain computing result;
the sub-graph data accessing method being characterized in that:
further partitioning the sub-graph data that were partitioned according to the locality of the graph data into sub-blocks that match a size of the on-chip BRAM memory based on random storage properties of an on-chip BRAM of the FPGA accelerator for vertex data, so that the sub-blocks are suitable to be stored in corresponding storage units, thereby in a condition that the sub-blocks are able to pass through a DRAM and the on-chip BRAM successively and then get stored in a parallel manner in virtue of a memory structure inside the FPGA accelerators, the compute unit is able to access the sub-graph data by directly accessing a corresponding local memory without crossing the compute units while ensuring the locality of the graph data, so that a task assignment sub-module is able to perform the dynamic task assignment on the graph data according to the load imbalance magnitude between the at least two FPGA accelerators and/or a processing speed of the compute units in each of the at least two FPGA accelerators so as to realize the dynamic graph processing of the graph data.

7. A task assignment method for based on graph data using multiple FPGA accelerators, being applicable to a graph processing system having at least two FPGA accelerators, for dynamically compensating a local load imbalance magnitude between the at least two FPGA accelerators formed during a process of partitioning sub-graph data based on locality of the graph data by modulating load balance between processing elements of compute units in each said FPGA accelerator, the task assignment method comprising:
portioning each said sub-graph data into a plurality of sub-tasks, and placing at least one of the plurality of sub-tasks into at least one processing element belonging to an identical compute unit in the FPGA accelerator in a form of at least one task queue, so as to maintain load balance between the processing elements by means of fine-grained task assignment;
the task assignment method being characterized in that,
when the at least one processing element has completed the corresponding at least one task queue, the internal processing element takes at least one task queue that is in other internal processing elements of the compute unit the internal processing element belongs to and has not been processed, so that when the compute unit has completed processing the sub-graph data, the compute unit is able to take the sub-graph data that have not been processed, thereby compensating a local load imbalance magnitude between the at least two FPGA accelerators formed during a process of partitioning the sub-graph data based on the locality of the graph data.

* * * * *